United States Patent [19]
Brown

[11] Patent Number: 5,203,889
[45] Date of Patent: Apr. 20, 1993

[54] PROCESS AND SYSTEM FOR FRACTIONATING GASEOUS MIXTURES

[75] Inventor: Jeffrey M. Brown, Windham, Me.

[73] Assignee: General Signal Corporation, Stamford, Conn.

[21] Appl. No.: 846,802

[22] Filed: Mar. 5, 1992

[51] Int. Cl.⁵ .................................. B01D 53/04
[52] U.S. Cl. .................................. 55/163; 55/179; 55/189; 55/208; 55/387
[58] Field of Search .......... 55/23, 25, 26, 58, 62, 55/68, 74, 75, 161–163, 179, 189, 208, 387, 389

[56] References Cited

U.S. PATENT DOCUMENTS

| | | | |
|---|---|---|---|
| 2,588,296 | 3/1952 | Russell, Jr. | 55/33 X |
| 3,104,953 | 9/1963 | Arend et al. | 55/33 X |
| 3,891,410 | 6/1975 | Hankison | 55/179 X |
| 3,950,154 | 4/1976 | Henderson et al. | 55/179 |
| 3,989,478 | 11/1976 | Jones | 55/23 X |
| 4,165,972 | 8/1979 | Iles et al. | 55/179 X |
| 4,205,967 | 6/1980 | Sandman et al. | 55/21 |
| 4,263,018 | 4/1981 | McCombs et al. | 55/18 |
| 4,285,917 | 8/1981 | Knight | 55/23 X |
| 4,295,863 | 10/1981 | Lattuada | 55/33 X |
| 4,312,851 | 1/1982 | Isalski et al. | 55/23 X |
| 4,329,158 | 5/1982 | Sircar | 55/26 |
| 4,392,871 | 7/1983 | Almlöf et al. | 55/23 |
| 4,494,966 | 1/1985 | Umeki | 55/26 |
| 4,522,636 | 6/1985 | Markbreiter et al. | 55/208 X |
| 4,557,735 | 12/1985 | Pike | 55/26 |
| 4,614,525 | 9/1986 | Reiss | 55/25 |
| 4,698,073 | 10/1987 | Rohde et al. | 55/179 X |
| 4,732,579 | 3/1988 | Veltman et al. | 55/23 |
| 4,769,051 | 9/1988 | Defrancesco | 55/179 |
| 4,778,670 | 10/1988 | Pinto | 55/25 X |
| 4,793,832 | 12/1988 | Veltman et al. | 55/23 |
| 4,832,711 | 5/1989 | Christel, Jr. et al. | 55/20 |
| 4,954,146 | 9/1990 | Garrett et al. | 55/25 |
| 5,087,178 | 2/1992 | Wells | 55/33 X |

Primary Examiner—Robert Spitzer
Attorney, Agent, or Firm—Robert R. Hubbard; John F. Ohlandt

[57] ABSTRACT

A process and system which provides for the heatless or pressure swing fractionation of a gaseous mixture which comprises first and second fractionation columns containing appropriate adsorption materials, together with heat exchangers, and especially featuring a compressed gas pressure powered motor driving a compressor so as to recover energy released due to the pressure reduction in one of the process flow streams.

24 Claims, 3 Drawing Sheets

PROCESS AND SYSTEM FOR FRACTIONATING GASEOUS MIXTURES

The present invention relates generally to the process of fractionation of gaseous mixtures, more particularly to the process and to the system in which the gas removing material employed in the fractionating process may be cyclically regenerated without the introduction of heat from an external source of power.

BACKGROUND OF THE INVENTION

Various systems have been used for fractionating gaseous mixtures in which relatively adsorbent or similar material is employed to remove one or more components from a gaseous mixture. The overall effectiveness of such a material is reduced as it becomes laden with the component or components that are to be removed from the mixture, and therefore requires periodic regeneration.

Adsorbent gas fractionators usually involve the use of two adsorbent beds, one of which is being regenerated (i.e., desorbed) while the other is on the adsorptive cycle. Typically, the gas to be fractionated is passed through one sorbent bed in one direction in the adsorption cycle, and then, after a predetermined time interval, when the sorbent can be expected to have adsorbed so much of the gas being removed that there is a danger that the required low concentration of that gas in the effluent will not be met, the influent gas is switched to the other adsorbent bed, and the spent adsorbent bed is regenerated by heating and/or by evacuation and/or by passing purge effluent gas therethrough, usually in counterflow, and at a reduced pressure.

Adsorbent gas fractionators on the market today are of two general types, a heat-reactivatable type, in which heat is applied to regenerate the spent sorbent at the conclusion of the adsorbent cycle, and a heatless or pressure swing type, in which heat is not applied to regenerate the spent sorbent at the conclusion of the adsorbent cycle, but in which a purge flow of pure gas, usually effluent gas from the bed on the adsorption cycle, is passed through the spent bed at a lower pressure.

The present invention is directed to pressure swing or heatless type of adsorbent gas fractionation systems whereby a gaseous mixture, at elevated pressure, first passes through an adsorbent material after which a small fraction of the purified stream, at reduced pressure is flowed through the contaminant laden material desorbing the contaminant and carrying it away.

Conventional pressure swing or heatless processes utilize a pair of adsorbent beds, i.e., one to purify the pressurized gaseous mixture while the other is being purged of the contaminants by a metered amount of the purified gas which has been expanded to a lower pressure. Control systems and automatic valves are typically used to reverse the role of the two sorbent beds at intervals.

Some examples of conventional pressure swing or heatless adsorbent fractionator processes and systems are set forth in U.S. Pat. Nos. 4,205,967 (Sandman et al.), which issued Jun. 3, 1980; 4,832,711 (Christel, Jr. et al.), which issued May 23, 1989; 4,954,146 (Garrett et al.), which issued Sep. 4, 1990; 4,494,966 (Umeki), which issued Jan. 22, 1985; 4,329,158 (Sircar), which issued May 11, 1982; and 4,263,018 (McCombs et al.), which issued Apr. 21, 1981.

Pressure swing fractionation processes are commercially attractive for several reasons: simplicity of structure and function, low initial and maintenance costs, and no requirement for substantial power input during operation. However, the conventional pressure swing processes are less efficient than other alternatives. Several factors contribute to this inefficiency. The most significant is the fact that the energy for the process is derived from the pressurized stream itself which is at best a more costly source of energy.

To better understand the inefficiencies of the conventional pressure swing processes, it is helpful to envision the properties of an ideal system. The present inventor recognized that the ideal system would include: an ideal flow with no pressure drop in the beds or plumbing, and an ideal purge in which the partial pressure of the contaminants in the purge stream as it exits the low pressure bed equals the partial pressure of the contaminants in the mixed stream as it enters the high pressure bed. In such an ideal system, the fraction of the incoming stream required for purge would equal the ratio of the absolute pressure of the purge stream to that of the high pressure stream in their respective beds.

In contrast with the ideal system, the ratio of purge to input flow rates in known pressure swing systems is constrained by the fact that the absolute pressure of the purge stream is 14.7 psia (or atmospheric pressure). As the energy which is required to regenerate in conventional processes is essentially the energy required to elevate the purge stream to the higher pressure required for initial purification, it is clear that the operating efficiency of conventional pressure swing systems is constrained from significant improvement. That is, the efficiency of conventional systems is destined by theory and practice to be significantly less than alternative methods of fractionation because the purge stream is constrained to atmospheric pressure.

U.S. Pat. No. 4,557,735 (Pike) discloses an efficient integrated system wherein process energy is utilized efficiently. However, the integrated system disclosed by Pike is extremely complicated and is primarily directed to the preparation of feed air, i.e., compression, cooling and cleaning of the air, for eventual separation by cryogenic rectification. More important, however, Pike pertains to a heat-reactivatable type of adsorbent gas fractionator, not a pressure swing or heatless type such as that disclosed in the present invention. Furthermore, the gaseous mixture is passed through a cryogenic rectification for the purpose of separating the feed air into nitrogen-rich and oxygen-rich components before being warmed and returned to a second purifying heat regenerable adsorbent.

It is an object of the present invention to provide a more efficient pressure swing or heatless adsorbent fractionation process and system for the fractionation of gaseous mixtures without the need for introducing additional external energy to the system.

It is a further object of the present invention to take advantage of energy in the form of elevated temperatures in the high pressure mixed stream that may be present as a result of an upstream compression process to enhance the efficiency of the fractionation process.

Another object is to utilize the energy laden in the high pressure purge stream prior to expansion to increase the efficiency of the fractionation process.

The present invention also provides many additional advantages which shall become apparent as described below.

SUMMARY OF THE INVENTION

Briefly stated, the invention resides in a process and system which provides for the "heatless" or "pressure swing" fractionation of a gaseous mixture which comprises first and second fractionation columns containing appropriate adsorption materials, together with heat exchangers, and especially featuring a compressed gas pressure powered motor driving a compressor so as to recover energy released due to the pressure reduction in one of the process flow streams.

This system for separating a gaseous mixture by means of pressure swing adsorption fractionation preferably comprises: a pre-heater means which is capable of recovering thermal energy produced throughout the system, a first adsorption unit which is capable of adsorbing waste gases and producing product gases from the gaseous mixture, a second adsorption unit which is capable of being desorbed by a purge stream from the system, a compressor means capable of recovering energy released due to the pressure reduction in a purge stream, a pressure powered motor used to drive the compressor means, and a system of valves and conduits which provide for the efficient utilization of energy during operation of the system. The pressure powered motor produces and stores energy generated from a heated purge stream of either the first or second adsorption unit, whereby the stored energy is used to pressurize gaseous streams delivered to the compressor means. Optionally, the system may also include an after heater means.

More specifically, the invention relates to a reversible, energy efficient system for separating a gaseous mixture by means of pressure swing adsorption fractionation. This system comprises: a means for directing a source stream of gaseous mixture to a first adsorption unit wherein the gaseous mixture is fractionated such that waste gases are adsorbed and product gases are passed through the first adsorption unit; a means for dividing the product gases into a product stream and a purge stream; a means for directing the purge stream to a pre-heater means wherein the purge stream is heated to a desirable temperature; a means for directing the preheated purge stream to a pressure powered motor wherein rotational mechanical energy is produced and/or stored, the purge stream is cooled, and the pressure of the purge stream is reduced; a means for directing the purge stream from the pressure powered motor to a second adsorption unit wherein the waste gases in the second adsorption unit are desorbed and wherein the purge stream becomes enriched with the waste gases; a means for directing the waste gas enriched purge stream to a compressor means wherein the enriched purge stream is compressed to near atmospheric pressure, the compressor means being powered by the rotational mechanical energy produced by and/or stored within the pressure powered motor and wherein the enriched purge stream is heated by virtue of the work done upon it by the compressor means; whereby the compressor means creates a subatmospheric pressure in the second adsorption unit to enhance the desorption; means for directing the heated purge stream to the pre-heater means wherein the heat of compression is recovered; means for venting the purge stream of step h from the system; means for controlling the system wherein the functions of the first adsorption unit and the second adsorption unit are periodically reversed to enable the regeneration of each adsorption unit; and means for storing rotational mechanical energy produced by the pressure powered motor when the system is reversed and wherein the mechanical energy is recovered by the compressor means after the reversing of the system is complete.

A particularly useful embodiment of this invention may be characterized as a reversible system for separating a gaseous mixture by means of pressure swing adsorption fractionation which comprises: a means for selectively directing a compressed gaseous mixture to a pre-heater means and/or an after heater means, wherein heat from the compressed gaseous mixture is recovered thereby; a means for directing the gaseous mixture from the pre-heater means and/or the after heater means to a cooler, wherein additional heat from the gaseous mixture is recovered by the cooler; means for directing the gaseous mixture from the cooler to a first adsorption unit wherein the gaseous mixture is fractionated wherein waste gases are adsorbed and product gases are passed through the first adsorption unit; means for dividing the product gases into a product stream and a purge stream; means for directing the purge stream to the after heater means wherein the purge stream is heated; means for directing the heated purge stream to a pressure powered motor wherein rotational mechanical energy is produced and/or stored, and wherein said purge stream is cooled and simultaneously reduced in pressure by virtue of the mechanical work it does; means for directing the purge stream from the pressure powered motor to the pre-heater means and/or the after heater means wherein the pruge stream is brought to ambient temperature; means for directing the ambient purge stream to a second adsorption unit wherein the waste gases in the second adsorption unit are desorbed and wherein the purge stream becomes enriched with the waste gases; means for directing the waste gas enriched purge stream from the second adsorption unit to a compressor means wherein the purge stream is compressed to near atmospheric pressure, the compressor means being powered by the rotational mechanical energy produced by and/or stored within the pressure powered motor and wherein the purge stream is heated by virtue of the work done upon it by the compressor means; means for directing the purge stream from the compressor means to the after heater means and/or to the pre-heater means wherein the heat of compression is recovered; means for venting the purge stream; means for controlling the system wherein the functions of the first adsorption unit and the second adsorption unit are periodically reversed to enable the regeneration of each adsorption unit; and means for storing rotational mechanical energy produced by the pressure powered motor when the system is reversed and wherein the mechanical energy is recovered by the compressor means after the reversing of the system is complete.

Other and further objects, advantages and features of the present invention will be understood by reference to the following specification in conjunction with the annexed drawings, wherein like parts have been given like numbers.

DESCRIPTION OF THE PREFERRED EMBODIMENTS

In order to eliminate the waste of energy associated with the expansion of a gas at high pressure through a restriction to a lower pressure, as occurs in conventional pressure swing fractionation systems, the present inventor has undertaken the task of replacing the traditional throttling valves and/or regulators with appropriate motors. By doing so, the present inventor has been able to capture mechanical energy during the expansion steps which may later be applied to perform useful work. Preferably, this mechanical energy can be employed within the adsorption fractionator process itself to lower the pressure in the desorbing bed; thereby reducing the volume of purge flow required to regenerate without the input of additional external energy.

Figure 1:
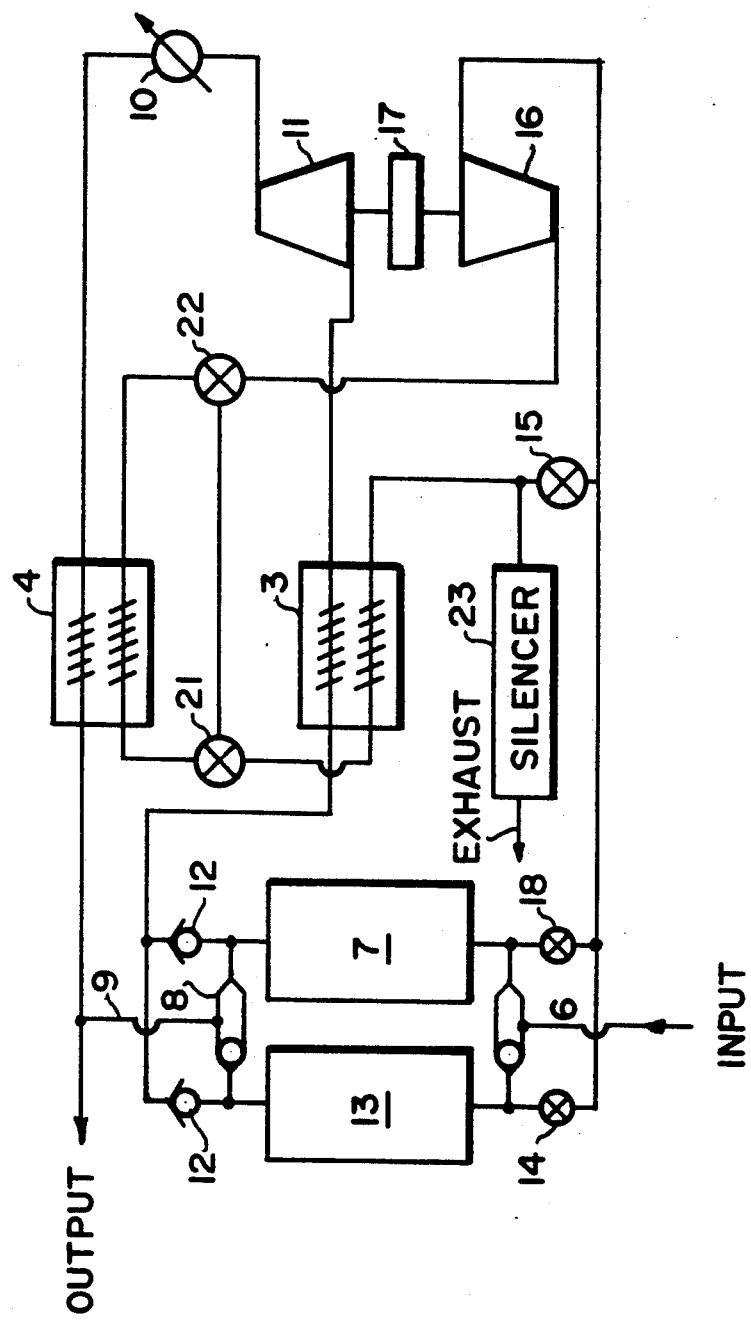
FIG. 1 is a schematic representation of an adsorbent fractionation process and system according to one embodiment of the present invention.
Figure 2:
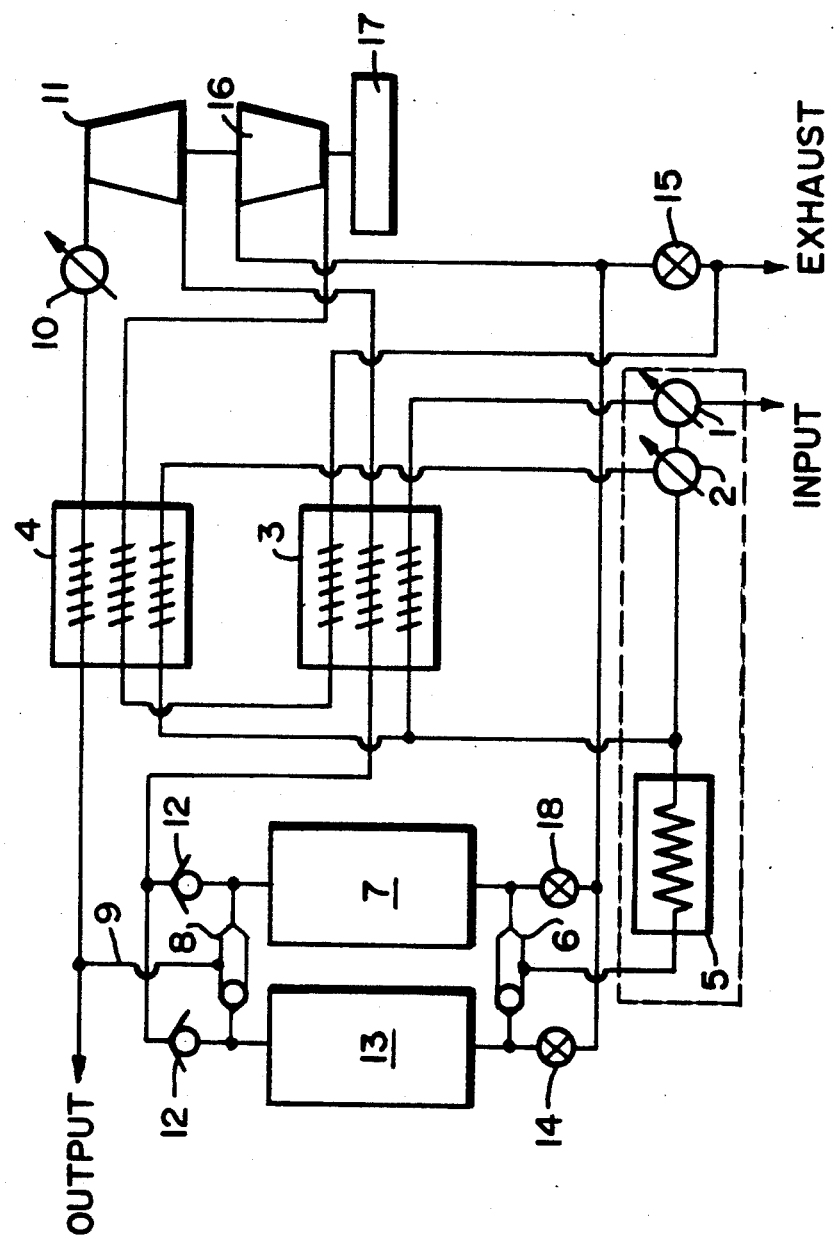
FIG. 2 is a schematic representation of an adsorbent fractionation process and system according to another embodiment of the present invention comprising a single state turbo-compressor.

The present invention can best be described by referring to the attached drawings, wherein FIGS. 1 and 2 demonstrate various system designs according to this invention. For instance. FIG. 1 generally depicts a reversible, energy efficient system for separating a gaseous mixture by means of pressure swing adsorption fractionation. This system comprises: a means 6 for directing a source stream of gaseous mixture to a first adsorption unit 7 wherein the gaseous mixture is fractionated such that waste gases are adsorbed and product gases are passed through first adsorption unit 7; a means 8 for dividing the product gases into a product stream and a purge stream; a means for directing the purge stream to a pre-heater means 4 wherein the purge stream is heated to a desirable temperature; a means for directing the preheated purge stream to a pressure powered motor 11 wherein rotational mechanical energy is produced and/or stored, the purge stream is cooled, and the pressure of the purge stream is reduced; a means for directing the purge stream from pressure powered motor 11 to a second adsorption unit 13 wherein the waste gases in second adsorption unit 13 are desorbed and wherein the purge stream becomes enriched with the waste gases; a means 14 for directing the waste gas enriched purge stream to a compressor means 16 wherein the enriched purge stream is compressed to near atmospheric pressure, compressor means 16 being powered by the rotational mechanical energy produced by and/or stored within pressure powered motor 11 and wherein the enriched purge stream is heated by virtue of the work done upon it by compressor means 16; whereby compressor means 16 creates a subatmospheric pressure in second adsorption unit 13 to enhance the desorption; means for directing the heated purge stream to pre-heater means 4 wherein the heat of compression is recovered; means 15 for venting the purge stream; means 12, 14 and 18 for controlling the system wherein the functions of the first adsorption unit and the second adsorption unit are periodically reversed to enable the regeneration of each adsorption unit; and means 17 for storing rotational mechanical energy produced by pressure powered motor 11 when the system is reversed and wherein the mechanical energy is recovered by compressor means 16 after the reversing of the system is complete. Optionally, the system shown in FIG. 1 may include an after heater means 3 and directional valves 21 and 22 such that the purge stream which exits compressor means 16 can pass through preheater 4, after heater 3, or both. Prior to exhausting purge stream from the system, it may be preferable to pass it through a silencer 23.

In the embodiment shown in FIG. 2 a single stage turbo-compressor unit is employed to achieve the energy recovery due to the expansion of the purge stream. To maximize the pressure reduction achieved in the desorbing bed the purge stream is heated prior to entry into the power turbine. Two heat sources are typically available for this purpose. The output from the compressor stage of the turbo-compressor is elevated in temperature and may be used as a heat source in any embodiment. The output stream from an upstream source compressor may also be at an elevated temperature and when tapped prior to the usual compressor after cooler is an excellent heat source of preheating the purge stream. Additional heat may be added at this point by means of electrical heaters for optimization and/or control. The preheat process typically will be insufficient to prevent the output from the power turbine from falling below ambient temperature hence an after heater is employed in this stream prior to its admission to the desorbing bed. The same heat sources are available for this process.

There are transient conditions which occur during the reversal of flow in the beds. For this reason an unloader valve is present to off load the compressor stage of the turbo-compressor during the period when the low pressure bed is being repressurized. The unloader valve also remains open briefly after the high pressure tower purge shutoff valve opens allowing the blast of air from the bed to vent directly to atmosphere. Energy produced by the power turbine during the repressurization is stored in a simple fly wheel integral to the turbo-compressor and is then available to the compressor stage when the time comes to pump down the bed just entering the desorption process.

FIG. 2 operates as follows: gas directly from an upstream source compressor (not shown) enters after heater control valve 1 and pre-heater control valve 2 where a portion of the hot stream is diverted to after heater 3 (i.e., heat exchanger) and pre-heater 4 (i.e., heat exchanger) prior to its entry into source compressor after cooler 5 and on to intake control valve 6. When heat from the source compressor (not shown) is not being recovered in the process the mixed gas at high pressure enters directly at input control valve 6 and by-pass after heater 3, pre-heater 4 and cooler 5. Input control valve 6 directs the high pressure stream to first adsorption unit 7. After exiting first adsorption unit 7 the stream enters output control valve 8 and flows on to flow divider tee 9 where a product stream is directed to the output and a new purge stream is directed to pre-heater 4. Once heated in pre-heater 4 the purge stream passes through a control valve 10 and on to the input of power turbine 11. The purge stream exits power turbine 11 and flows to after heater 3 where it is brought to ambient temperature. The purge stream then passes through the appropriate purge flow check valve 12 and enters second adsorption unit 13 (i.e., during this flow pattern second adsorption unit 13 acts as a desorption unit). The purge stream thereafter exits second adsorption unit 13 via the appropriate purge shutoff valve 14 and flows past a closed compressor input unloader valve 15 directly to the input of compressor stage 16 of the turbo-compressor where it is compressed to atmospheric pressure. Leaving the compressor stage the stream is directed to pre-heater 4 and, optionally, after heater 3 where it sheds its heat of compression before being exhausted.

Optionally, the process and system according to the present invention can be operated without application of after heater 3. It is also conceivable to operate the process and system without the application of pre-heater 4. However, the preferred embodiment requires utilization of both after heater 3 and pre-heater 4.

When the appropriate time comes to reverse the flows in the adsorption units for the purpose of regenerating either of the adsorption units, compressor input unloader valve 15 is opened and the purge shutoff valve 14 is closed simultaneously. The purge stream repressurizes second adsorption unit 13 through power turbine 11. With the load removed from compressor stage 16, power turbine 11 accelerates storing rotational mechanical energy in flywheel 17. The other purge shutoff valve 18 opens once second adsorption unit 13 has equalized in pressure and allows a blast of purge gas to flow to the open compressor intake unloader valve 15 where it is vented. At the same time, as a result of the opening of the purge shutoff valve 18 both the intake control valve 6 and the output control valve 8 cycle to the opposite position. Shortly thereafter the compressor intake unloader valve 15 is closed and the turbo-compressor pulls down the pressure in first adsorption unit 7 (during reverse operation this unit operates as a desorption device) with the aid of the mechanical energy stored in flywheel 17. The process reverses again in an identical fashion at the appropriate time.

Power turbine 11 is broadly classified as a pressure powered motor which is capable of producing mechanical energy from a purge stream. The mechanical output of the motor may be employed to perform any other auxiliary functions such as, but not limited to, generation of electrical power of control, heating or cooling, or for any other function. The motor can be selected from the group consisting of: positive displacement piston, gear, rocking piston, diaphragm, rotary vane, impulse turbine, axial flow turbine, radial flow turbine, single stage, multi-stage with or without inter-stage heating, or any other form of pressure driven motor.

Compressor 16 is preferably selected from the group consisting of: positive displacement piston, gear, rocking piston, diaphragm, rotary vane, axial flow turbine, centrifugal turbine, single stage, multi-stage with or without inter-stage cooling, or any other form of compressor means.

The adsorption units and associated control valves should be designed so as to perform the pressure swing process regardless of flow configuration, sequencing, timing, number of adsorption units, capacities, size, manufacturing techniques, or any other variation resulting from the use of engineering discretion.

Figure 3:
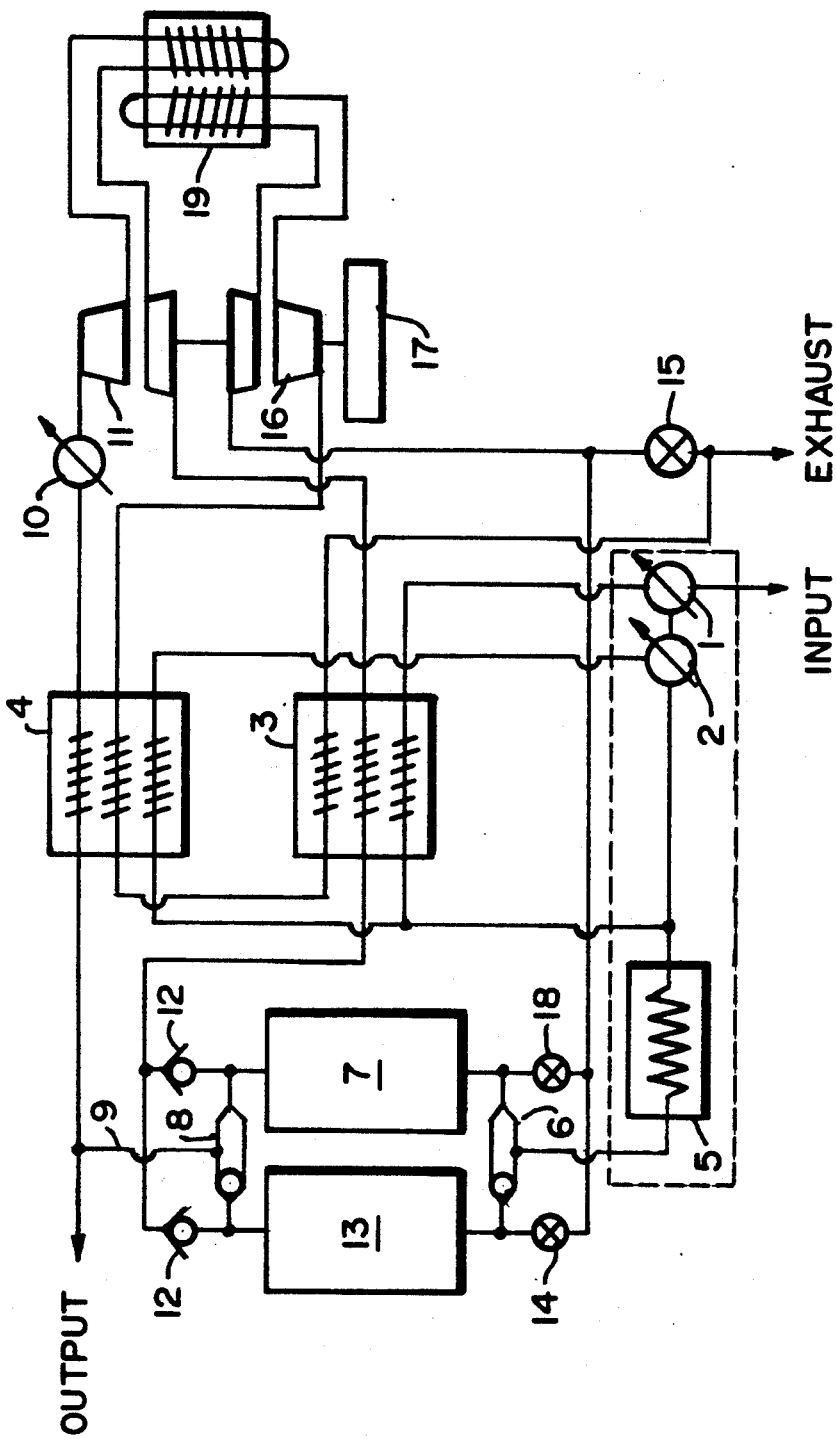
FIG. 3 is a schematic representation of an adsorbent fractionation process and system according to another embodiment of the present invention comprising a multi-stage turbo-compressor.

FIG. 3 depicts a multi-stage turbo-compressor for use in higher pressure applications, wherein power turbine 11 and compressor 16 each has more than one stage. Optionally, the various stages being connected by means of either an inter-heating unit or inter-cooling unit 19.

Although not shown in the figures, the upstream compressor(s) is typically either a watersealed type, an oilsealed screw or rotary type, or piston type. The watersealed type compressor operates such that the recirculating hot water associated therewith may serve as a heat source for after heater 3 and/or pre-heater 4. Similarly, recirculating oil associated with an oilsealed screw or rotary type compressor may serve as a heat source for after heater 3 and/or pre-heater 4.

Optionally, electrical heaters may be disposed about after heater 3, pre-heater 4 and/or the adsorption units to increase the overall efficiency, performance and control of the process.

In the industrial compressed air dehydration systems operating pressures are often found to range between 80 psig and 150 psig. At these pressures the use of turbo-compressors could result in purge stream reductions ranging from 40% to 75%. The operating cost reduction of such a system will make this process competitive with refrigeration systems, and membrane systems.

The process and system according to this invention can be used in many applications, e.g., dehydration of compressed air or oxygen enrichment processes. Preferably used with compressed air having pressures less than 175 psig. In particular, this process is useful in the dehydration of compressed air for use in industrial application either as process dry air or as utility dry air. Some examples of the commercial application of the dehydrated compressed air are the pressurization of communication cables, coax cables, wave guides, wave guide cables, multi and single pair telephone cables, fiber optic cables, sheaths and related equipment.

While I have shown and described several embodiments in accordance with my invention, it is to be clearly understood that the same are susceptible to numerous changes apparent to one skilled in the art. Therefore, I do not wish to be limited to the details shown and described but intend to show all changes and modifications which come within the scope of the appended claims.

What is claimed is:

1. A system for separating a gaseous mixture by means of pressure swing adsorption fractionation which comprises:
   a. means for directing a source stream of gaseous mixture to a first adsorption unit wherein said gaseous mixture is fractionated such that waste gases are adsorbed and product gases are passed through said first adsorption unit;
   b. means of dividing said product gases into a product stream and a purge stream;
   c. means for directing said purge stream to a pre-heater means wherein said purge stream is heated to a desirable temperature;
   d. means for directing the preheated purge stream to a pressure powered motor wherein rotational mechanical energy is produced and/or stored, said purge stream is cooled, and the pressure of said purge stream is reduced;
   e. means for directing said purge stream from said pressure powered motor to a second adsorption unit wherein the waste gases in said second adsorption unit are desorbed and wherein said purge stream becomes enriched with said waste gases;
   f. means for directing the waste gas enriched purge stream to a compressor means wherein said enriched purge stream is compressed to near atmospheric pressure, said compressor means being powered by said rotational mechanical energy produced by and/or stored within said pressure powered motor and wherein said enriched purge stream is heated by virtue of the work done upon it by said compressor means; whereby said compressor means creates a subatmospheric pressure in said second adsorption unit to enhance said desorption;

g. means for directing said heated purge stream to said pre-heater means wherein the heat of compression is recovered;

h. means for venting said heated purge stream of said pre-heater means from said system;

i. means for controlling said system wherein the functions of said first adsorption unit and said second adsorption unit are periodically reversed to enable the regeneration of each adsorption unit; and j. means for storing rotational mechanical energy produced by said pressure powered motor when said system is reversed and wherein said mechanical energy is recovered by said compressor means after the reversing of said system is complete.

2. The system according to claim 1 wherein said pre-heater means is a pre-heater conduit means with at least one external heater means.

3. The system according to claim 1 wherein said pre-heater means is at least one heat exchanger.

4. The system according to claim 3 wherein said at least one heat exchanger includes at least one external heater means.

5. The system according to claim 1 further comprising a flow control means disposed between said pre-heater means and said pressure powered motor.

6. The system according to claim 5 wherein said flow control means is a pressure regulator means and/or a control valve means.

7. The system according to claim 1 further comprising an after heater means disposed between said pressure powered motor and said second adsorption unit, said after heater means being capable of adjusting the purge stream exiting said pressure powered motor to near ambient temperature.

8. The system according to claim 7 wherein said after heater means is an after heater conduit means with at least one cooler means.

9. The system according to claim 7 wherein said after heater means is at least one heat exchanger means.

10. The system according to claim 9 wherein said at least one heat exchanger means includes at least one cooler means.

11. The system according to claim 7 further comprising a means for directing said heated purge stream from said pre-heater means to said after heater means.

12. The system according to claim 7 further comprising a means for compressing said source stream and a means for directing the compressed source stream to said pre-heater means and/or said after heater means, whereby heat from the compressed source stream is recovered.

13. The system according to claim 7 further comprising a means for directing process streams which are external to said system and which contain waste heat to said pre-heater means and/or said after heater means, thereby increasing the total thermal or mechanical efficiency of said system.

14. The system according to claim 7 further comprising at least one liquid sealed compressor which is capable of producing recirculated hot liquid and a means for delivering said recirculated hot liquid to said pre-heater means and/or said after heater means for thermal energy recovery.

15. The system according to claim 14 wherein said liquid is either oil or water.

16. The system according to claim 1 wherein said gaseous mixture is compressed air, said product gases are dry air and said waste gases are primarily water vapor.

17. The system according to claim 1 wherein said gaseous mixture is compressed air, said product gases are dry air and said waste gases are primarily water vapor and nitrogen.

18. The system according to claim 1 wherein said pressure powered motor is selected from the group comprising: positive displacement piston, gear, rocking piston, diaphragm, rotary vane, impulse turbine, axial flow turbine, radial flow turbine, single stage, multi-stage with or without inter-stage heating, and any other form of pressure driven motor.

19. The system according to claim 1 wherein said compressor means is selected from the group comprising: positive displacement piston, gear, rocking piston, diaphragm, rotary vane, axial flow turbine, centrifugal turbine, single stage, multi-stage with or without inter-stage cooling, and any other form of compressor means.

20. The system according to claim 1 wherein said pressure powered motor is a power turbine, said compressor means is a compressor turbine, and said energy storage means is a fly wheel, said power turbine, compressor turbine and fly wheel being jointly mounted on a common axial drive shaft.

21. A system for separating a gaseous mixture by means of pressure swing adsorption fractionation which comprises:

a. means for selectively directing a compressed gaseous mixture to a pre-heater means and/or an after heater means, wherein heat from said compressed gaseous mixture is recovered thereby;

b. means for directing said gaseous mixture from said pre-heater means and/or said after heater means to a cooler, wherein excess heat from said gaseous mixture is removed by said cooler;

c. means for directing said gaseous mixture from said cooler to a first adsorption unit wherein said gaseous mixture is fractionated wherein waste gases are adsorbed and product gases are passed through said first adsorption unit;

d. means for dividing said product gases into a product stream and a purge stream;

e. means for directing said purge stream to said pre-heater means wherein said purge stream is heated;

f. means for directing the heated purge stream to pressure powered motor wherein rotational mechanical energy is produced and/or stored, and wherein said purge stream is cooled and simultaneously reduced in pressure by virtue of the mechanical work it does;

g. means for directing said purge stream from said pressure powered motor to said after heater means wherein said purge stream is brought to ambient temperature;

h. means for directing the ambient purge stream to a second adsorption unit wherein the waste gases in said second adsorption unit are desorbed and wherein said purge stream becomes enriched with said waste gases;

i. means for directing the waste gas enriched purge stream from said second adsorption unit to a compressor means wherein said purge stream is compressed to near atmospheric pressure, said compressor means being powered by said rotational mechanical energy produced by and/or stored within said pressure powered motor and wherein said purge stream is heated by virtue of the work done upon it by said compressor means;
j. means for directing the purge stream from said compressor means to said after heater means and/or to said pre-heater means wherein the heat of compression recovered;
k. means for venting said purge stream;
l. means for controlling said system wherein the functions of said first adsorption unit and said second adsorption unit are periodically reversed to enable the regeneration of each adsorption unit; and
m. means for storing rotational mechanical energy produced by said pressure powered motor when said system is reversed and wherein said mechanical energy is recovered by said compressor means after the reversing of said system is complete.

22. A system for separating a gaseous mixture by means of pressure swing adsorption fractionation which comprises: a pre-heater means and/or an after heater means capable of recovering thermal energy produced throughout said system, a first adsorption unit which is capable of adsorbing waste gases and producing product gases from said gaseous mixture, a second adsorption unit which is capable of being desorbed by a purge stream from said system, a compressor means capable of recovering energy released due to the pressure reduction in a purge stream, and a pressure powered motor used to drive said compressor means.

23. The system according to claim 22 wherein said pressure powered motor produces and stores energy generated from a heated purge stream of either said first or second adsorption unit, whereby the stored energy is used to pressurize gaseous streams delivered to said compressor means.

24. The system according to claim 22 further comprising an after heater means.

* * * * *